(12) United States Patent
Takikawa et al.

(10) Patent No.: US 8,942,576 B2
(45) Date of Patent: Jan. 27, 2015

(54) IMAGE FORMING APPARATUS AND IMAGE FORMING METHOD

(71) Applicant: Canon Kabushiki Kaisha, Tokyo (JP)

(72) Inventors: Yoichi Takikawa, Kawasaki (JP); Hideki Kubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 13/654,227

(22) Filed: Oct. 17, 2012

(65) Prior Publication Data

US 2013/0101301 A1 Apr. 25, 2013

(30) Foreign Application Priority Data

Oct. 20, 2011 (JP) ................... 2011-230909

(51) Int. Cl.
*G03G 15/00* (2006.01)
*H04N 1/401* (2006.01)
*H04N 1/407* (2006.01)

(52) U.S. Cl.
CPC ........... *H04N 1/401* (2013.01); *G03G 15/5058* (2013.01); *G03G 15/55* (2013.01); *H04N 1/4078* (2013.01)
USPC ............................................. 399/10; 399/44

(58) Field of Classification Search
None
See application file for complete search history.

(56) References Cited

U.S. PATENT DOCUMENTS

2009/0251715 A1* 10/2009 Kita ............................ 358/1.9

FOREIGN PATENT DOCUMENTS

JP 2007-140402 A 6/2007

* cited by examiner

*Primary Examiner* — Clayton E Laballe
*Assistant Examiner* — Jas Sanghera
(74) *Attorney, Agent, or Firm* — Canon U.S.A., Inc. IP Division

(57) ABSTRACT

An image forming apparatus for forming an image based on an electrophotographic process applied to image data that represents the image includes a device configured to perform a periodic movement for image formation, a storage unit configured to store a table for correcting density variation caused by the device, the table initially generated when a physical property of the device is in a reference state, a prediction unit configured to predict an amplitude of the variation caused when the physical property is in a state different from the reference state, and an adjustment unit configured to adjust the table based on the amplitude predicted by the prediction unit.

12 Claims, 16 Drawing Sheets

SUB SCANNING DIRECTION

SUB SCANNING DIRECTION

IMAGE FORMING APPARATUS AND IMAGE FORMING METHOD

BACKGROUND OF THE INVENTION

1. Field of the Invention

The present invention relates to an image forming apparatus and an image forming method for forming an image based on the electrophotographic process.

2. Description of the Related Art

Conventional laser beam printers and copying machines which form an image by irradiating an image bearing member with a scanning laser beam are known as electrophotographic image forming apparatuses. Generally, such an electrophotographic image forming apparatus forms an image through a plurality of processes including the charging, exposure, development, transfer, fixing, and cleaning processes.

A general electrophotographic process will be described below. A charging unit uniformly charges a photosensitive member (image bearing member). An exposure unit exposes the charged photosensitive member to a laser beam according to an image signal to form an electrostatic latent image on the photosensitive member. The direction in which the laser beam scans is referred to as the main scanning direction. During rotation of the photosensitive member in the sub scanning direction perpendicularly intersecting with the main scanning direction, an electrostatic latent image is formed on the photosensitive member. Then, a development unit develops the electrostatic latent image on the photosensitive member to form a toner image on the photosensitive member. In toner image formation, the development unit charges toner and then applies the charged toner to the photosensitive member via a developing roller rotating at an approximately constant speed. The toner adheres to the electrostatic latent image to form a toner image. Then, the toner image on the photosensitive member is transferred onto a recording medium and is then fixed, thus completing image formation. Residual transfer toner on the photosensitive member is collected by a cleaning unit.

With such an image forming apparatus, horizontal streaks (hereinafter referred to as banding) by density variation may arise in the formed image because of various causes. There has been a problem that the image quality is remarkably degraded by banding.

For example, banding may occur when the rotational speed of the developing roller changes. When the developing roller rotates at high speed, the amount of toner supply increases to increase the amount of toner adhering to the electrostatic latent image, forming an image thicker than the intended image. When the developing roller rotates at low speed, the amount of toner supply decreases to decrease the amount of toner adhering to the electrostatic latent image, forming an image lighter than the intended image.

A method for correcting the amount of exposure based on the result of reading an image formed on an intermediate transfer belt is discussed in Japanese Patent Application Laid-Open No. 2007-140402.

If the image forming apparatus is continuously operated, a physical property of a device related to image formation changes, possibly changing the amplitude of the banding. However, the method discussed in Japanese Patent Application Laid-Open No. 2007-140402 performs, based on the result of reading a correction image at a certain timing, correction processing in a subsequent fixed time period. In some cases, therefore, this method may be unable to suitably correct the amount of exposure.

SUMMARY OF THE INVENTION

The present invention features, among other things, achieving suitable banding correction by predicting an amplitude of banding at the time of printing and performing banding correction processing based on the predicted amplitude of banding.

According to an aspect of the present invention, an image forming apparatus for forming an image based on an electrophotographic process applied to image data that represents the image includes a device configured to perform a periodic movement for image formation, a storage unit configured to store a table for correcting density variation caused by the device, the table initially generated when a physical property of the device is in a reference state, a prediction unit configured to predict an amplitude of the variation caused when the physical property is in a state different from the reference state, and an adjustment unit configured to adjust the table based on the amplitude predicted by the prediction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
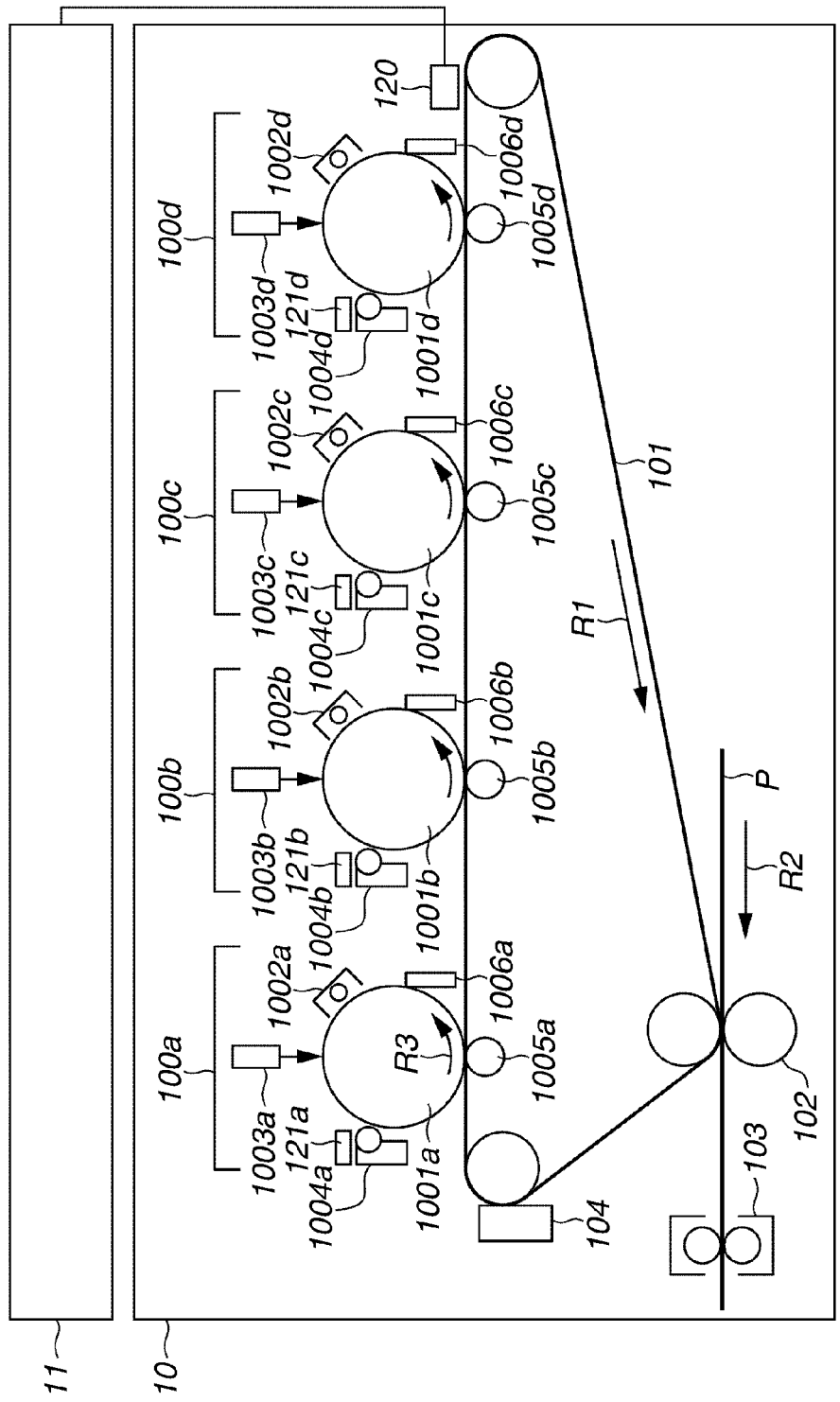
FIG. 1 is a block diagram illustrating a configuration of an image forming apparatus according to a first exemplary embodiment of the present invention.

FIG. 1 is a block diagram illustrating a configuration of an image forming apparatus according to a first exemplary embodiment of the present invention. Referring to FIG. 1, the image forming apparatus according to the present exemplary embodiment includes an engine 10 and a controller 11. The engine 10 includes image forming units 100a, 100b, 100c, and 100d for cyan (C), magenta (M), yellow (Y), and black (K) colors, respectively, a density sensor 120, a secondary transfer unit 102, and an intermediate transfer belt cleaning unit 104, which are arranged along the intermediate transfer belt 101 in the rotational direction R1 of an intermediate transfer belt 101. A fixing unit 103 is provided on the downstream side of the secondary transfer unit 102. Each of the image forming units 100a, 100b, 100c, and 100d for cyan (C), magenta (M), yellow (Y), and black (K) colors performs similar processing. The image forming unit 100a includes a photosensitive drum 1001a, a charging unit 1002a, an exposure unit 1003a, a developing unit 1004a, a primary transfer unit 1005a, a cleaning unit 1006a, and a rotation phase acquisition unit 121a. The image forming units 100b, 100c, and 100d have a similar configuration.

Operations of the image forming apparatus will be described in detail below. First of all, image formation processing performed by the image forming apparatus will be described below. The image forming units 100a, 100b, 100c, and 100d form toner images on respective photosensitive drums by using toner of respective colors, and primarily transfer the respective toner images in sequence onto the intermediate transfer belt 101. Generally, the image forming apparatus uses toner of four (C, M, Y, and K) colors. In the present exemplary embodiment, the image forming units 100a, 100b, 100c, and 100d use C, M, Y, and K toner, respectively. The number of image forming units and the number of colors to be used are not limited to four. For example, light ink and clear ink may be used. The order of arrangements of the image forming units for respective colors is not be limited to the order in the present exemplary embodiment, and may be any order. The image forming units 100a, 100b, 100c, and 100d perform toner image formation in parallel in this order at different timings at fixed intervals. The photosensitive drum 1001a of the image forming unit 100a is provided with a negatively-charged organic photosensitive layer on the circumferential surface, and rotates in the direction indicated by the arrow R3.

When a negative voltage is applied to the charging unit 1002a, it irradiates the surface of the photosensitive drum 1001a with charged particles. Thus, the surface of the photosensitive drum 1001a is charged to a uniform negative potential. The charged photosensitive drum 1001a rotates in the direction indicated by the arrow R3.

The exposure unit 1003a emits a laser beam based on a control signal acquired from the controller 11 to scan the photosensitive drum 1001a with the laser beam. Thus, an electrostatic latent image is formed on the surface of the charged photosensitive drum 1001a.

The developing unit 1004a supplies negatively-charged toner to the photosensitive drum 1001a by using a developing roller rotating at an approximately constant speed. Thus, toner adheres to the electrostatic latent image on the photosensitive drum 1001a to apply reversal development to the electrostatic latent image. The developing roller used in the present exemplary embodiment is formed of an aluminum cylinder coated with conductive rubber containing dispersed carbon for electrical resistance adjustment.

When a positive voltage is applied to the primary transfer unit 1005a, it primarily transfers the negatively-charged toner borne on the photosensitive drum 1001a onto the intermediate transfer belt 101.

The cleaning unit 1006a removes residual toner on the photosensitive drum 1001a that has passed through the primary transfer unit 1005a.

The image forming unit 100a for C color has specifically been described. The image forming units 100b, 100c, and 100d perform a similar operation. When forming a color image, each of the image forming units 100a, 100b, 100c, and 100d for respective colors sequentially performs the charging, exposure, development, primary transfer, and cleaning processes. As a result, toner images of four colors are formed on the intermediate transfer belt 101 in a superimposing way.

The secondary transfer unit 102 secondarily transfers the superimposed toner images borne by the intermediate transfer belt 101 onto a recording medium P moving in the direction indicated by the arrow R2.

The fixing unit 103 applies pressing and heating processing to the recording medium P, on which a full-color toner image has been secondarily transferred, to fix the image onto the recording medium P.

The intermediate transfer belt cleaning unit 104 removes residual toner on the intermediate transfer belt 101 that has passed through the secondary transfer unit 102.

The image formation processing has specifically been described above. With such an image forming apparatus which performs image formation by using the above-described electrophotographic process, banding arises by various causes. Banding caused by the developing roller will be described in detail below. Hereinafter, suffixes a, b, and c added to reference numerals used for each image forming unit and elements in each image forming unit will be omitted. For example, an image forming unit 100 indicates each of the image forming units 100a, 100b, 100c, and 100d.

In the development process, it is desirable that the developing roller of the developing unit 1004 constantly conveys a fixed amount of toner to a developing position in a unit time. Generally, therefore, the developing roller is formed of a cylinder having a true-circle cross section and is controlled to rotate at a constant speed centering on a straight line passing through the center of the two bottom faces. The developing roller and toner are constantly charged to a fixed potential.

However, the rotational speed of the developing roller may fluctuate, causing banding. Rotating the developing roller at high speed increases the amount of toner conveyed thereby and rotating it at low speed decreases the amount of toner, causing image density variation or banding. Fluctuation in the rotational speed of the developing roller is caused by, for example, fluctuation in the rotational speed of a motor driving the developing roller and a defective gear connecting the developing roller with the motor.

Figure 2A:
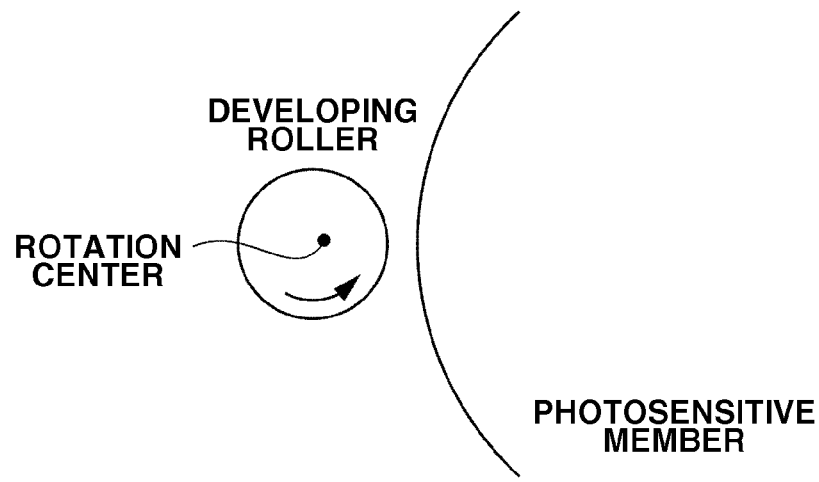
FIGS. 2A and 2B schematically illustrate a deviation of a rotational axis of a developing roller.
Figure 2B:
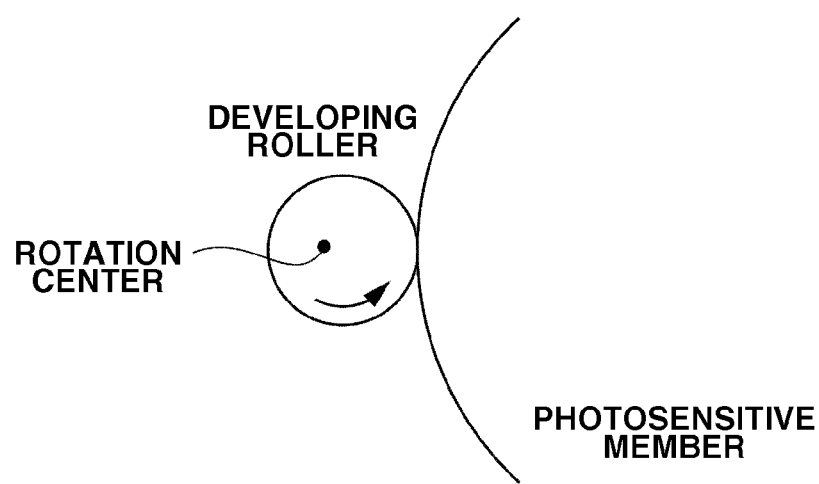

Banding is also caused by a deviation of the rotational axis of the developing roller. FIGS. 2A and 2B schematically illustrate a deviation of the rotational axis of the developing roller. FIG. 2A illustrates a state where the developing roller surface is separated from the photosensitive drum surface. FIG. 2B illustrates a state where the developing roller surface is close to the photosensitive drum surface. If a deviation of the rotational axis of the developing roller occurs, the states in FIGS. 2A and 2B are repeated in alternation in synchronization with the rotation period of the developing roller. The state in FIG. 2A produces a low development efficiency and the state in FIG. 2B produces a high development efficiency.

Thus, various causes in the developing roller bring about image density variation or banding.

The amplitude of the above-described banding depends on the cause. One of major causes of amplitude variation is that the electrical resistance of the conductive rubber of the developing roller changes when electricity is turned on. More specifically, a development current accompanying the voltage application during image formation processing increases the number of conducting paths in the conductive rubber, gradually decreasing the electrical resistance. Simultaneously, the amount of voltage drop by the electrical resistance of the developing roller decreases and a developing bias voltage exceeds an initial value. When the developing bias voltage rises, the development contrast increases to increase the amount of development (increase the density of the formed image). This causes an increase in the banding amplitude. Meanwhile, if image formation processing is kept being stopped after the electrical resistance of the developing roller temporarily decreases, the electrical resistance of the developing roller gradually increases and the steady-state electrical resistance is restored. Thus, a physical property change in a device related to image formation changes the banding amplitude.

Figure 12A:
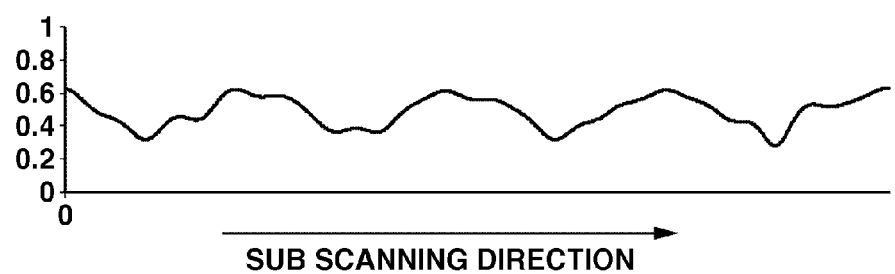
FIGS. 12A and 12B illustrate examples of banding amplitude variations.
Figure 12B:
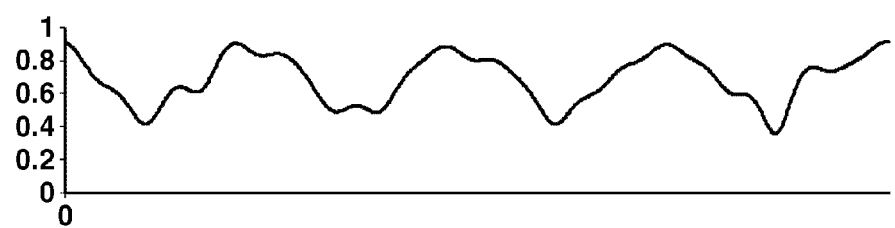

FIGS. 12A and 12B illustrate examples of banding amplitude variations. Referring to FIGS. 12A and 12B, the horizontal axis is assigned the position of an image in the sub scanning direction and the vertical axis is assigned the average density in each sub scanning direction. FIG. 12A illustrates banding when the developing roller has the steady-state electrical resistance. FIG. 12B illustrates banding when the electrical resistance of the developing roller decreases by continuous printing. Banding illustrated in FIG. 12B has a larger amplitude than banding illustrated in FIG. 12A. Therefore, a table for correcting banding generated when the developing roller has the steady-state (reference-state) electrical resistance cannot necessarily correct banding in FIG. 12B.

In the present exemplary embodiment, the controller 11 applies banding correction processing to banding occurring in synchronization with the rotation period of the developing roller. In this case, the electrical resistance (a physical property) of the developing roller is also taken into consideration. Specifically, the controller 11 predicts the electrical resistance of the developing roller at the time when an image subjected to the banding correction processing is formed. Based on the predicted electrical resistance (hereinafter referred to as prediction resistance), the controller 11 calculates a predicted banding amplitude (hereinafter referred to as prediction amplitude) at the relevant time and adjusts the amount of banding correction.

Figure 3:
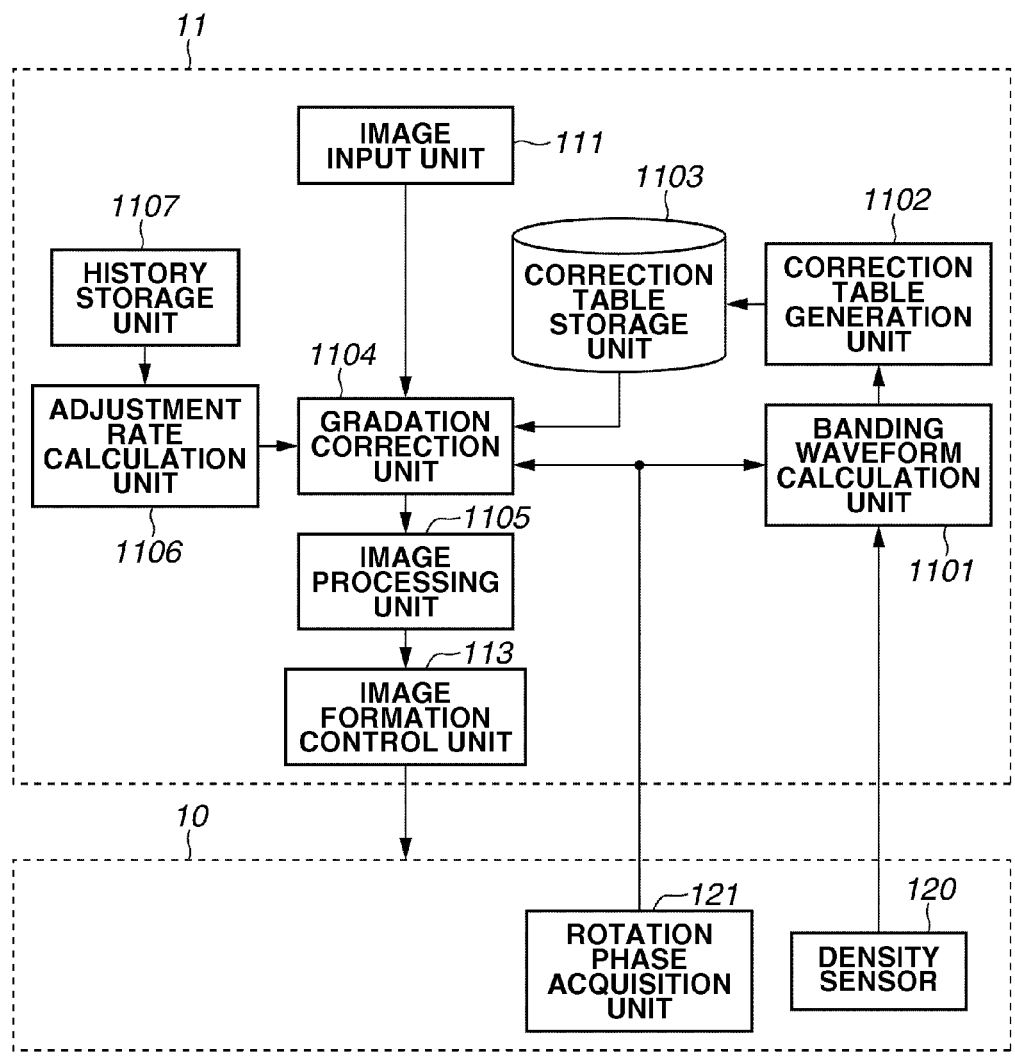
FIG. 3 is a block diagram illustrating a configuration for banding correction according to the first exemplary embodiment.

FIG. 3 is a block diagram illustrating a configuration of the image forming apparatus according to the present exemplary embodiment for performing the banding correction processing. A history storage unit 1107 stores a current application history and a reference resistance. An adjustment rate calculation unit 1106 calculates an adjustment rate based on the current application history and the reference resistance stored in the history storage unit 1107. The adjustment rate calculation unit 1106 outputs the calculated adjustment rate to a gradation correction unit 1104. The density sensor 120 detects the density of toner images primarily transferred from the image forming units 100a, 100b, 100c, and 100d onto the intermediate transfer belt 101. The density sensor 120 outputs the detected density to the banding waveform calculation unit 1101. Rotation phase acquisition units 121a, 121b, 121c, and 121d acquire the rotation phase of the developing roller included in the developing units 1004a, 1004b, 1004c, and 1004d, respectively. The rotation phase acquisition unit 121 outputs the rotation phase of the developing roller to the banding waveform calculation unit 1101 and the gradation correction unit 1104. The banding waveform calculation unit 1101 calculates a banding waveform based on the density of toner images acquired from the density sensor 120 and the rotation phase acquired from the rotation phase acquisition unit 121. A method for calculating a banding waveform will be described below. The banding waveform calculation unit 1101 outputs the calculated banding waveform to a correction table generation unit 1102. The correction table generation unit 1102 generates a correction table based on the banding waveform acquired from the banding waveform calculation unit 1101, and outputs the generated table to a correction table storage unit 1103. The correction table storage unit 1103 receives the correction table from the correction table generation unit 1102 and stores the correction table. An image input unit 111 receives input image data from outside, generates color image data of Y, M, C, and K colors, and outputs the generated color image data to the gradation correction unit 1104. The gradation correction unit 1104 corrects the color image data of respective colors based on the color image data of respective colors acquired from the image input unit 111 and the rotation phase acquired from the rotation phase acquisition unit 121. In this case, the gradation correction unit 1104 adjusts the correction table stored in the correction table storage unit 1103 based on the adjustment rate calculated by the adjustment rate calculation unit 1106. The gradation correction unit 1104 outputs the corrected color image data of respective colors to an image processing unit 1105. The image processing unit 1105 receives the corrected color image data of respective colors from the gradation correction unit 1104, and applies the regular gamma correction processing and halftone processing to the color image data to generate halftone image data that can be output from an image formation control unit 113. The image processing unit 1105 outputs the generated halftone image data to the image formation control unit 113. The image formation control unit 113 outputs a control signal to the engine 10 based on the halftone image data received from the image processing unit 1105, and performs the image formation processing.

The banding correction processing according to the present exemplary embodiment will be described in detail below. The banding correction processing according to the present exemplary embodiment includes correction table generation processing and correction image data generation processing.

Figure 4:
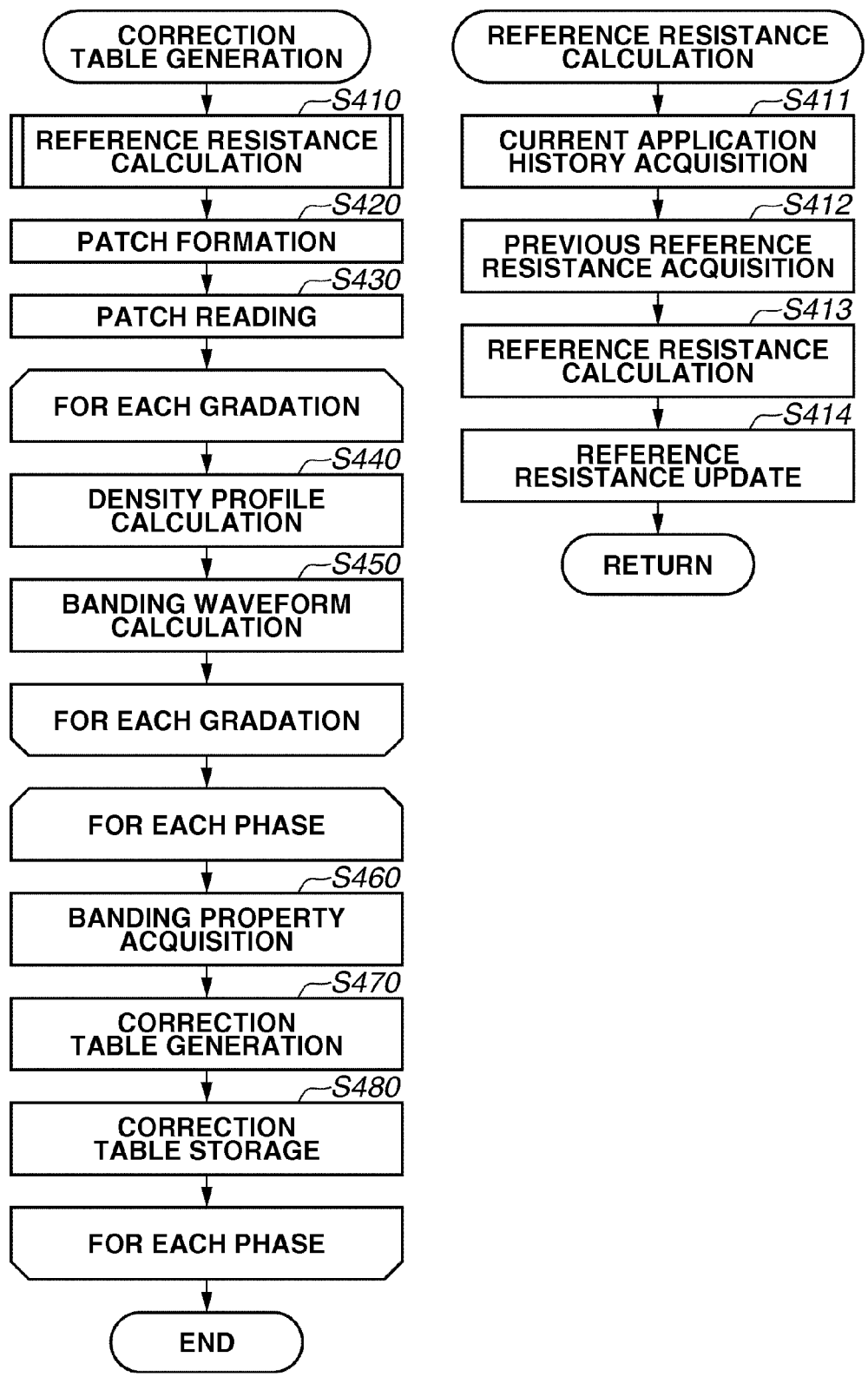
FIG. 4 is a flowchart illustrating correction table generation processing according to the first exemplary embodiment.

First of all, the correction table generation unit 1102 generates a correction table. FIG. 4 is a flowchart illustrating the correction table generation processing. The correction table generation processing is applied to image data of respective colors to be formed by the image forming units 100a, 100b, 100c, and 100d. Similar to the above-described case, suffixes a, b, and c added to reference numerals will be omitted. For example, the image forming unit 100 indicates each of the image forming units 100a, 100b, 100c, and 100d.

The correction table generation processing is repetitively performed at predetermined timings. Predetermined timings include a timing immediately after the power of the image forming apparatus is turned on and a timing after the image formation processing has been performed 100 times since the last correction table generation processing. In the correction table generation processing, the correction table stored in the correction table storage unit 1103 and the reference resistance stored in the history storage unit 1107 are calculated. Therefore, each time the correction table generation processing is performed, the correction table and the reference resistance are updated. Further, the correction table and the reference resistance are discarded when the power is turned off. The correction table updated at this timing is a table for deriving the corrected gradation for each gradation represented by image data. The correction table storage unit 1103 stores a plurality of correction tables respectively corresponding to a plurality of rotation phases. The correction table is generated so as to suitably correct banding occurring at the time of the correction table generation processing. The reference resistance updated at this timing is the electrical resistance of the developing roller at the time of the correction table generation processing. In the correction image data generation processing, the controller 11 predicts the electrical resistance of the developing roller at the time of image formation under different conditions from those at the time of correction table generation, and calculates the prediction resistance. Then, based on the updated reference resistance and prediction resistance, the controller 11 adjusts the stored correction table so as to suitably correct banding occurring at the time of image formation.

In step S410, the controller 11 executes reference resistance calculation processing. The reference resistance calculation processing executed in step S410 will be described in detail below.

Figure 10:
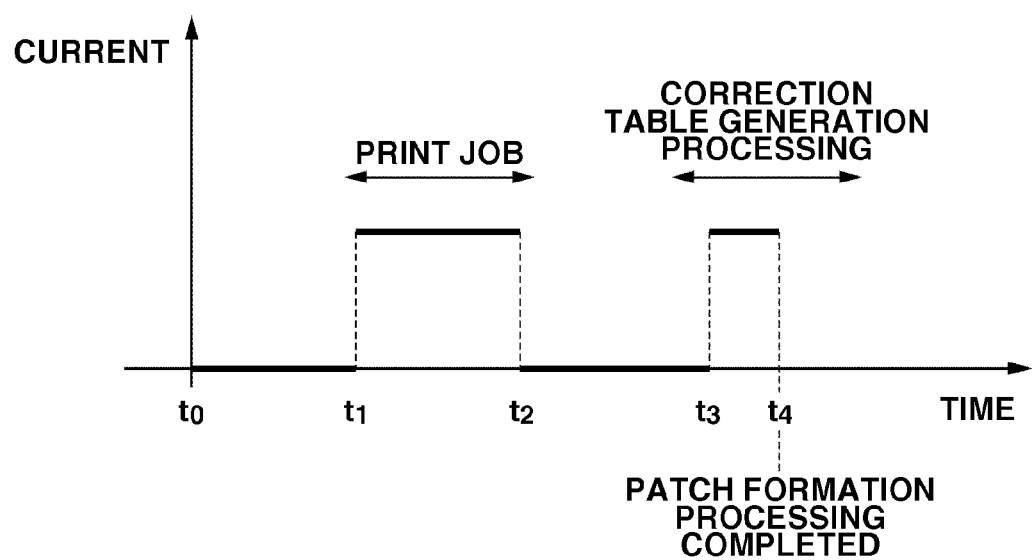
FIG. 10 illustrates an example of a current application history.

In step S411, the controller 11 executes current application history acquisition processing. The adjustment rate calculation unit 1106 acquires the current application history from the history storage unit 1107. The current application history is recorded information about applied current at each time, covering a time period since patch formation processing was completed in the last correction table generation processing until the present time. However, if the correction table generation processing has not been performed since the time of power-on until the present time, the current application history indicates a time period since the time of power-on until the present time. Further, the controller 11 additionally records in the acquired current application history the current to be applied until the end of the patch formation processing in the present correction table generation processing. FIG. 10 illustrates an example of the current application history after the current to be applied until the end of the patch formation processing. The current applied in a print job period is indicated in advance in the current application history. The current to be applied until the end of the present patch formation processing is information that was added to the current application history in step S411.

In step S412, the controller 11 executes previous reference resistance acquisition processing. The adjustment rate calculation unit 1106 acquires from the history storage unit 1107 the reference resistance (previous reference resistance) calculated and stored in the correction table generation processing last performed. If the correction table generation processing has not been performed and the reference resistance has not been stored in the history storage unit 1107 since the time of power-on until the present time, the controller 11 acquires a steady-state electrical resistance $R_{max}$ (described below).

In step S413, the controller 11 executes the reference resistance calculation processing. The adjustment rate calculation unit 1106 calculates the reference resistance of the developing roller based on the current application history acquired in step S411 and the previous reference resistance acquired in step S412. The reference resistance at the time of correction table generation is used in subsequent adjustment rate calculation. Details will be described below.

In step S414, the controller 11 executes reference resistance update processing. The adjustment rate calculation unit 1106 outputs the reference resistance calculated in step S413 to the history storage unit 1107. The history storage unit 1107 updates the received new reference resistance as the reference resistance. This completes the reference resistance calculation processing executed in step S410.

Figure 6:
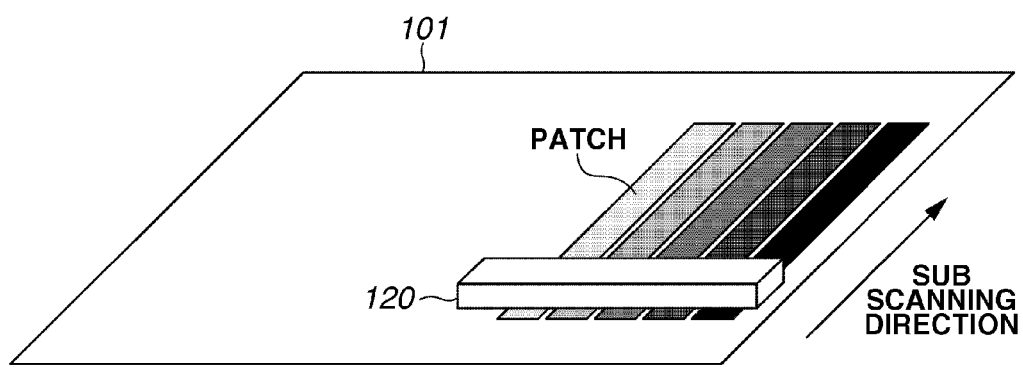
FIG. 6 schematically illustrates a patch.

In step S420, the controller 11 executes the patch formation processing. FIG. 6 schematically illustrates a patch. The patch includes a plurality of solid images having different gradations. As illustrated in FIG. 6, five solid images having different gradations are formed. Each solid image has a rectangular shape and a uniform gradation, and is designed such that the length of the sub scanning direction is 5 times or more the rotation period of the developing roller. The length of the sub scanning direction is not limited to 5 times or more the rotation period of the developing roller, and may be suitably determined based on, for example, the correction accuracy, processing time, and memory capacity to be used. Similar to the above-described image formation processing, the patch formation processing is performed by primarily transferring onto the intermediate transfer belt 101 the toner image formed on the photosensitive member by the image forming unit 100. In the patch formation processing, the rotation phase acquisition unit 121 acquires the rotation phase from the start of patch formation, and outputs the acquired rotation phase to the banding waveform calculation unit 1101.

In step S430, the controller 11 executes patch reading processing. The density sensor 120 detects the density of the patch transferred onto the intermediate transfer belt 101 in step S420. The density sensor 120 includes a plurality of reading units corresponding to the solid images constituting the patch formed in step S420 on a one-to-one basis. Specifically, the density sensor 120 includes at least five reading units. As the intermediate transfer belt 101 moves, each solid image passes below each corresponding reading unit. Each reading unit detects the density of the relevant solid image at fixed minute intervals, and outputs a density detection signal to the banding waveform calculation unit 1101. This means that density information obtained from each reading unit is not continuous information but information at discrete phases. The minute interval may be suitably determined in consideration of the rotation period of the developing roller, the conveyance speed of the intermediate transfer belt 101, and the correction accuracy.

The controller 11 applies the following processing in steps S440 and S450 to each of the solid images constituting the patch.

Figure 7A:
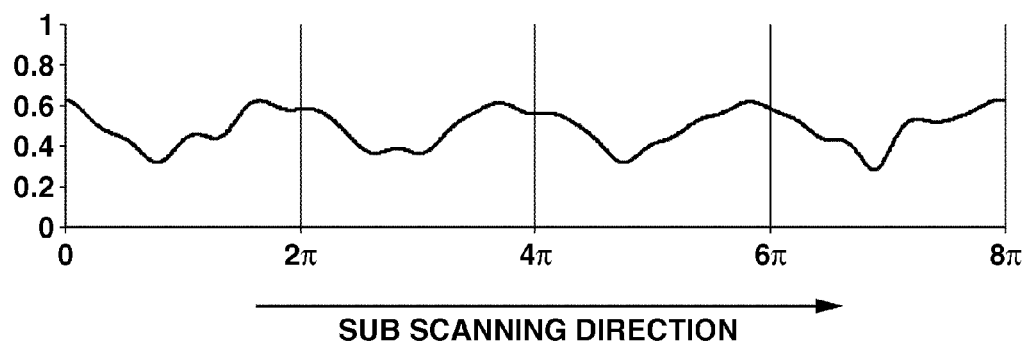
FIG. 7A illustrates an example of a density profile.

In step S440, the controller 11 executes density profile calculation processing. FIG. 7A illustrates an example of a density profile calculated in step S440. The banding waveform calculation unit 1101 sequentially arranges in the sub scanning direction the density detection signals acquired from the density sensor 120. Then, the banding waveform calculation unit 1101 receives from the rotation phase acquisition unit 121a rotation phase at the start time of patch formation. The banding waveform calculation unit 1101 further calculates a density profile by synchronizing the arranged density detection signals with the rotation phase at the time of patch formation. Referring to FIG. 7A, the horizontal axis is assigned the rotation phase of the developing roller, and the vertical axis is assigned the density. FIG. 7A illustrates that a density profile for four rotations of the developing roller is generated.

Figure 7B:
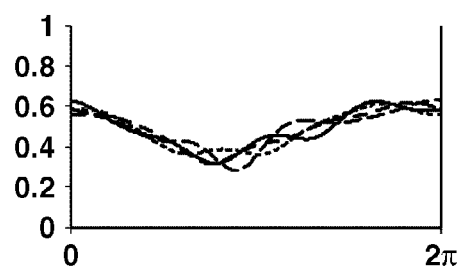
FIG. 7B illustrates the density profile in FIG. 7A clipped for each rotation period of the developing roller.
Figure 7C:
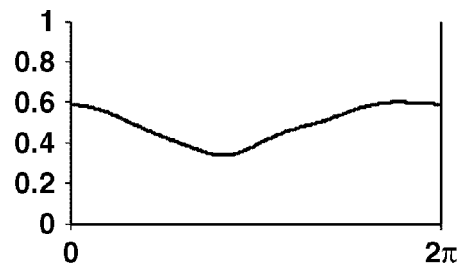
FIG. 7C schematically illustrates a waveform acquired by averaging the density profiles in FIG. 7B.

In step S450, the controller 11 executes banding waveform calculation processing. As illustrated in FIG. 7B, the banding waveform calculation unit 1101 clips the density profile calculated in step S440 for each rotation period of the developing roller. In this case, the density profile is clipped into four waveforms. Then, the controller 11 averages the four clipped waveforms to calculate a banding waveform (see FIG. 7C) for each of the solid images having a plurality of gradations constituting the patch. In the present exemplary embodiment, since five solid images having different gradations are formed in the patch, five different banding waveforms are acquired.

The controller 11 applies to the calculated banding waveforms the smoothing processing in the sub scanning direction and inclination correction processing. The smoothing processing in the sub scanning direction is performed to remove high-frequency banding components. If banding is not reproducible or if a phase deviation occurs in correction processing, high-frequency banding components are highly likely to emphasize uneven density. Therefore, it is desirable to remove high-frequency banding components through the smoothing processing. The controller 11 executes the inclination correction processing so as to equalize two inclinations obtained based on the values of the starting point (at phase 0) and ending point (at phase $2\pi$) of each banding waveform. Since the correction table generated based on each banding waveform is repetitively used in correction image formation processing (described below), it is desirable to perform the inclination correction processing to ensure the continuity between the starting and ending points of the banding waveform.

The controller 11 executes the following steps S460, S470, and S480 repetitively for each phase of the developing roller. All phases included in the banding waveform calculated based on the density detected by the density sensor 120 in step S450 are subjected to the repetitive processing.

Figure 8A:
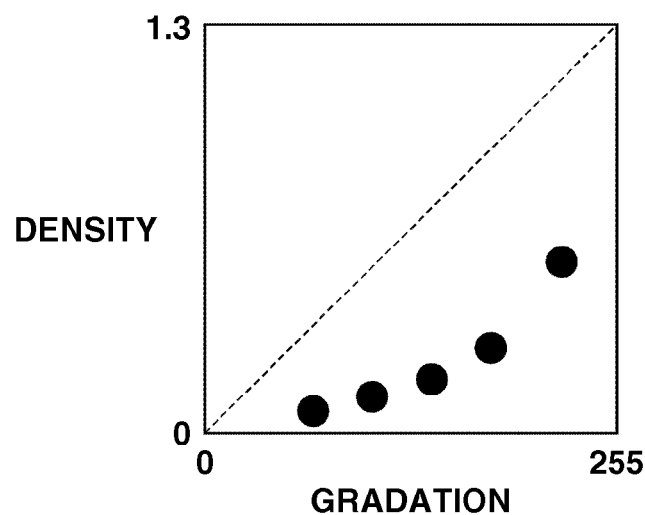
FIGS. 8A and 8B illustrate an example of a banding property table.
Figure 8B:
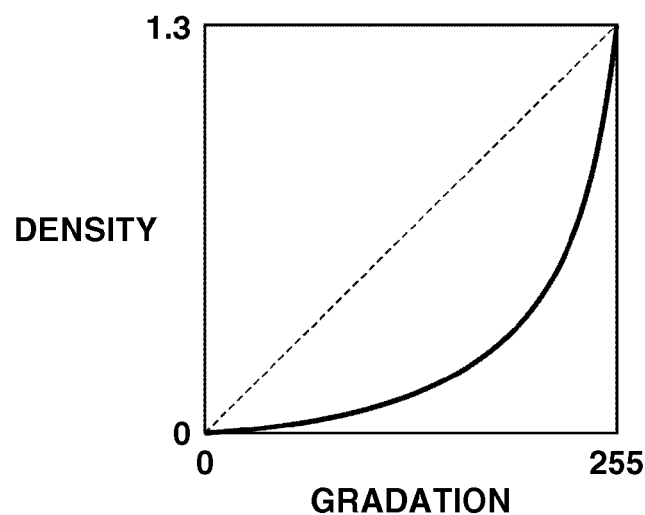

In step S460, the controller 11 executes banding property acquisition processing. The correction table generation unit 1102 selects one phase that has not undergone the banding property acquisition processing out of all phases, and considers the phase as a phase subjected to processing. Then, the controller 11 acquires the density at the selected phase subjected to processing based on the banding waveforms corresponding to respective five gradations generated in step S450. As illustrated in FIG. 8A, the controller 11 plots the obtained density values and the gradation in an associated way. Then, the controller 11 executes interpolation processing in the gradation direction, and calculates densities for all of gradations that can be represented by the image forming apparatus. The controller 11 generates a banding property table illustrated in FIG. 8B through the above-described processing. The above-described interpolation processing may be a general interpolation method such as linear interpolation.

Figure 9:
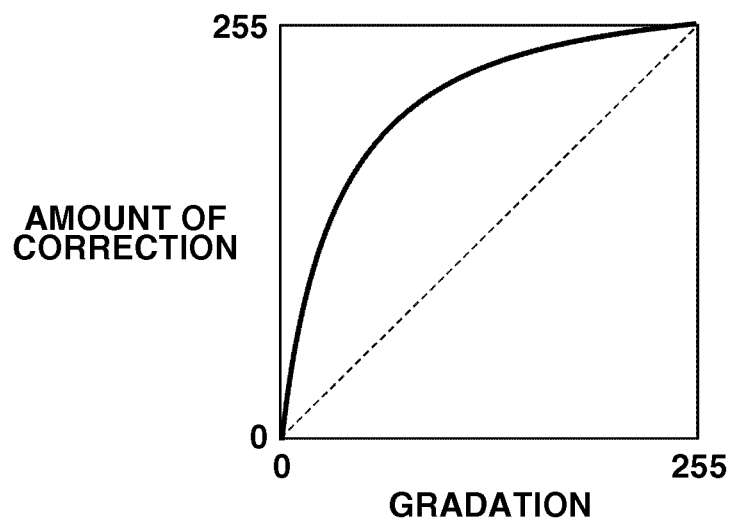
FIG. 9 illustrates an example of a correction table.

In step S470, the controller 11 executes the correction table generation processing. In the correction table generation processing, the controller 11 repetitively executes the following processing for all of gradations at the phase subjected to processing selected in S460. The correction table generation unit 1102 acquires a target density for a certain gradation. The correction table generation unit 1102 prestores target densities for respective gradations as tables and functions. Then, based on the banding property table calculated in step S460, the controller 11 acquires as a correction gradation a gradation corresponding to the acquired target density. The controller 11 applies above-described processing to each gradation and generates a correction table by associating the gradation with the correction gradation. FIG. 9 illustrates the correction table calculated in step S470.

In step S480, the controller 11 executes correction table storage processing. The correction table generation unit 1102 outputs the correction table generated in step S470 to the correction table storage unit 1103. The correction table storage unit 1103 stores the received correction table.

The reference resistance calculation processing in step S413 will be described in detail below. Based on the current application history (see FIG. 10) acquired in step S411 and the previous reference resistance acquired in step S412, the adjustment rate calculation unit 1106 calculates the reference resistance (the electrical resistance of the developing roller at time $t_4$) by using the following formulas (1) and (2).

Property 1: In a period during which a (non-zero) fixed current is applied, an electrical resistance R(t) of the developing roller at each time t is represented by the formula (1).

$$|R(t)-R_{min}|=R_0 \times a^{-kt} \quad (1)$$

The formula (1) means that the electrical resistance of the developing roller keeps decreasing over current application time, and then converges to a constant $R_{min}$.

Property 2: In a period during which no current is applied, the electrical resistance R(t) of the developing roller at each time t is represented by the formula (2).

$$|R(t)-R_{max}|=R_0 \times a^{-kt} \quad (2)$$

The formula (2) means that the electrical resistance of the developing roller keeps increasing over non-current application time, and then converges to a constant $R_{max}$.

$R_0$ in the formulas (1) and (2) indicates the electrical resistance of the developing roller at the start time in each period. $R_{max}$ and $R_{min}$ (convergence values of the electrical resistance) and a and k (determining the convergence speed of the electrical resistance) are constants depending on the material of the developing roller. These constants are precalculated through an experiment. The electrical resistance $R_{max}$ indicates the steady-state electrical resistance of the developing roller.

Referring to the current application history illustrated in FIG. 10, the previous reference resistance is the electrical resistance of the developing roller at time $t_0$. During a time period between time $t_0$ and time $t_1$, since no print job exists and no current is applied, the electrical resistance converges from the previous reference resistance to the steady-state electrical resistance. (When the previous reference resistance equals the steady-state electrical resistance $R_{max}$, the electrical resistance is maintained until the time $t_1$.) In a time period between time $t_1$ and time $t_2$, a current is applied by a print job executed therein and the electrical resistance of the developing roller gradually decreases. In a time period between time $t_2$ and time $t_3$, the electrical resistance increases to come close to the steady-state electrical resistance $R_{max}$. In a time period between time $t_3$ and time $t_4$, a current for the correction table generation processing is applied and the electrical resistance of the developing roller decreases again.

Therefore, the controller 11 calculates the electrical resistance at the time $t_1$ by using the formula (2) where $R_0$ indicates the previous reference resistance. Then, the controller 11 calculates the electrical resistance at the time $t_2$ by using the formula (1). The controller 11 repeats this processing to calculate the electrical resistance at the time $t_4$, and outputs the calculated electrical resistance as the reference resistance.

Figure 5:
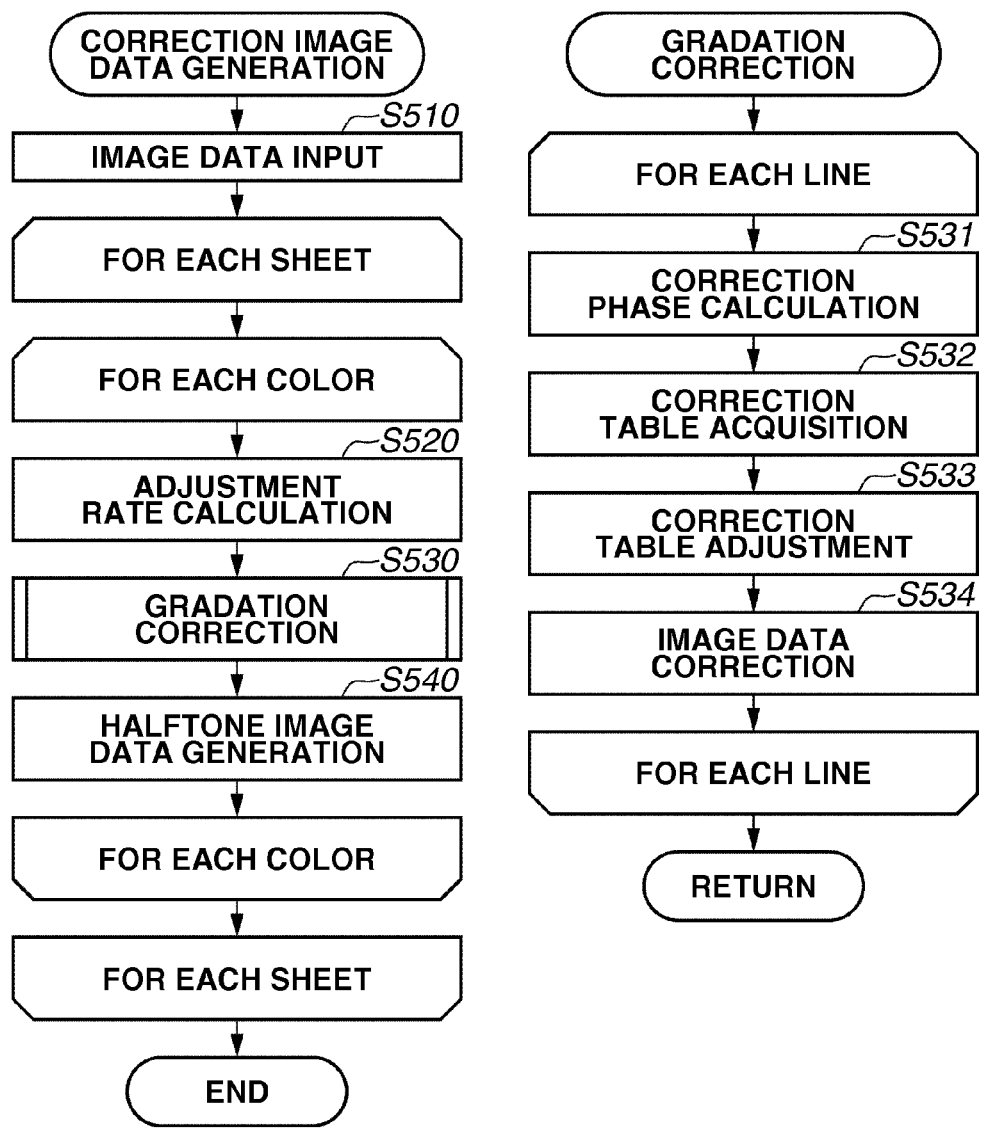
FIG. 5 is a flowchart illustrating correction image data generation processing according to the first exemplary embodiment.

Then, the controller 11 executes the correction image data generation processing. FIG. 5 is a flowchart illustrating the correction image data generation processing.

In step S510, the controller 11 executes image data input processing. The image data input unit 111 receives input image data from outside. Then, the image input unit 111 generates color image data of respective colors based on the received input image data. The controller 11 applies gradation correction processing (step S530) and halftone image generation processing (step S540) (described below) to the generated image data of respective colors.

Figure 11:
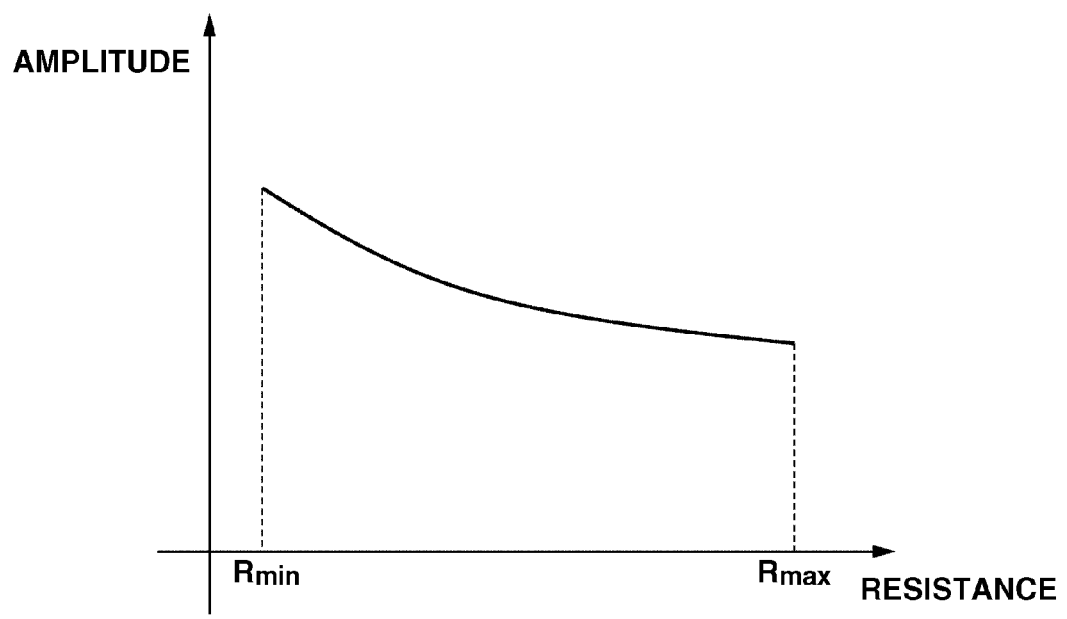
FIG. 11 illustrates an example of a resistance-to-amplitude correspondence table.

In step S520, the adjustment rate calculation unit 1106 executes adjustment rate calculation processing. The adjustment rate calculation processing in step S520 will be described in detail below. The adjustment rate calculation unit 1106 predicts the electrical resistance of the developing roller at the time of image formation. Step S520 is executed in a similar way to step S410. The current application history acquired in this case is the history of current application in a period since the time $t_4$ (at which the patch formation processing was completed in the above-described correction table generation processing) until the present time. The reference resistance acquired in this case is the value updated in the above-described step S414. Specifically, based on the history since the time $t_4$ until the present time (the time when image formation is performed), the controller 11 predicts the electrical resistance at the present time by using the formulas (1) and (2). Then, the adjustment rate calculation unit 1106 calculates a reference amplitude. The reference amplitude refers to the amplitude value of banding corresponding to the reference resistance calculated when the correction table generation processing was last performed. In this case, the controller 11 utilizes a prepared and prestored resistance-to-amplitude correspondence table. FIG. 11 illustrates an example of the resistance-to-amplitude correspondence table stored in the adjustment rate calculation unit 1106. The banding amplitude changes depending on the electrical resistance of the developing roller. The resistance-to-amplitude correspondence table records the banding amplitude with respect to the electrical resistance ranging from $R_{max}$ to $R_{min}$. Based on the resistance-to-amplitude correspondence table, the controller 11 acquires the amplitude corresponding to the reference resistance calculated in step S410 and considers it as the reference amplitude. The adjustment rate calculation unit 1106 further calculates the amplitude at the time of image formation. The amplitude at the time of image formation refers to the amplitude value (hereinafter referred to as prediction amplitude value) of banding predicted at the time of image formation. Similar to the reference amplitude calculation, the controller 11 acquires the amplitude corresponding to the prediction resistance at the time of image formation as the prediction amplitude. Finally, the controller 11 calculates an adjustment rate by using the following formula (3).

$$(\text{Adjustment rate})=(\text{Prediction amplitude})/(\text{Reference amplitude}) \quad (3)$$

In step S530, the controller 11 executes the gradation correction processing. The gradation correction unit 1104 selects color image data of one color that has not undergone the gradation correction processing out of the color image data of respective colors generated in step S510, and applies the gradation correction processing to the selected color image data.

In step S540, the controller 11 executes halftone image data generation processing. The image processing unit 1105 applies the regular gamma correction processing and halftone processing to the color image data that has undergone the gradation correction processing in step S530 to generate halftone image data. Then, the image processing unit 1105 outputs the generated halftone image data to the image formation control unit 113.

The gradation correction processing executed in step S530 will be described in detail below.

In the present exemplary embodiment, the controller 11 collectively applies the gradation correction processing to a group of pixels (herein after referred to as line) having the same position in the sub scanning direction in the color image data of respective colors. Then, the controller 11 repeats processing on a line basis for the number of pixels in the sub scanning direction. For example, when the color image data of respective colors contains 1000 pixels in the vertical direction (sub scanning direction) and 800 pixels in the horizontal direction (main scanning direction), the controller 11 collectively applies processing to one line of the 800 pixels in the horizontal direction, and repeats this processing for 1000 lines.

In step S531, the controller 11 executes correction phase calculation processing. The gradation correction unit 1104 acquires a rotation phase output by the rotation phase acquisition unit 121. Then, based on the acquired rotation phase, the pixel position of the line subjected to processing in the sub scanning direction, the time until the line subjected to processing is developed, and the average rotational speed of the developing roller, the gradation correction unit 1104 calculates the phase of the developing roller when the line subjected to processing is developed, and considers the calculated phase as the correction phase.

In step S532, the controller 11 executes correction table acquisition processing. The gradation correction unit 1104 reads from the correction table storage unit 1103 a correction table corresponding to a phase closest to the correction phase.

In step S533, the controller 11 executes correction table adjustment processing.

The gradation correction unit 1104 updates the correction table based on the adjustment rate. An example of correction table adjustment processing is illustrated below. As described above, the correction table records correction gradations for respective gradations represented by the image data. A correction gradation refers to a gradation to be achieved through correction. The controller 11 replaces a correction gradation $C(x)$ for each gradation x of the image data with an adjusted correction gradation $C'(x)$ obtained by the following formula (4).

$$C'(x)=(C(x)-x)\times(\text{Adjustment rate})+x \quad (4)$$

The formula (4) means the magnification (or reduction) of the amount of correction represented by "$C(x)-x$", by the adjustment rate. This enable calculating a correction gradation in consideration of electrical resistance variation of the developing roller. An adjusted correction table is calculated through the correction table adjustment processing in step S533.

In step S534, the controller 11 executes image data correction processing. The controller 11 executes this processing for each pixel of the line subjected to processing. Based on the adjusted correction table obtained in step S533, the gradation correction unit 1104 corrects the gradation of the color image data representing a noticed image element of the line subjected to processing. Based on the gradation of the color image data representing the noticed image element, the controller 11 derives a correction gradation and corrects the gradation of the color image data. The controller 11 repetitively executes step S534 for all of pixels of the line subjected to processing and completes step S534 for the line subjected to processing. The controller 11 repetitively applies the processing from steps S531 to S534 to all of the lines of the color image data of respective colors. When processing is completed for all of the lines, the controller 11 terminates the correction image data generation processing.

Figure 13A:
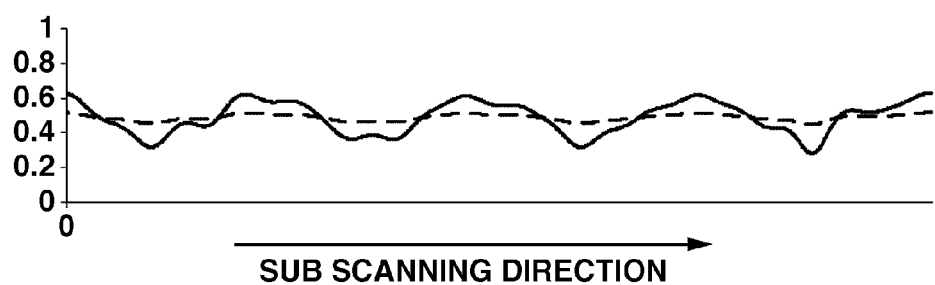
FIGS. 13A, 13B, and 13C illustrate effects of correction.
Figure 13B:
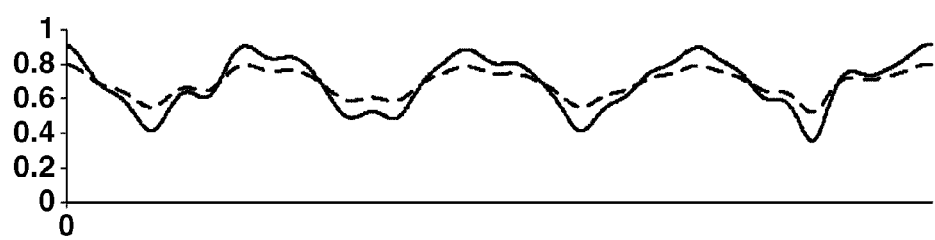
Figure 13C:
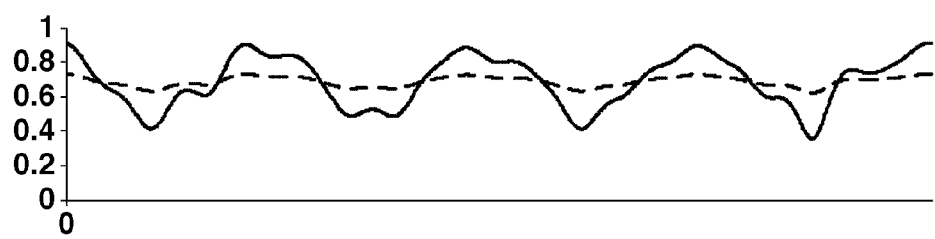

Effects of the present exemplary embodiment will be described below. FIGS. 13A, 13B, and 13C illustrate average densities of banded images before and after banding correction is applied. Referring to FIGS. 13A, 13B, and 13C, a solid line indicates an average density of a banded image without banding correction, and a dotted line indicates an average density of an image to which banding correction is applied.

FIG. 13A illustrates an example of banding correction applied immediately after completion of the correction table generation processing, by using the correction table as it is (without adjustment). The correction table is generated to suitably correct banding that has occurred when the correction table generation processing is applied. Therefore, immediately after the correction table generation processing where the electrical resistance of the developing roller almost remains unchanged, banding can be suitably corrected.

FIG. 13B illustrates an example of banding correction applied to banding having amplitude variation, by using the correction table as it is (without adjustment). In this case, banding remains because of insufficient correction. If image formation is successively repeated, the reduction in electrical resistance of the developing roller cannot be ignored over current application time. Therefore, when forming an image, since the banding amplitude has changed from the one at the time of correction table generation, the correction table used in the former example (see FIG. 13A) cannot provide sufficient correction effects.

FIG. 13C illustrates an example of banding correction applied after correction table adjustment in consideration of electrical resistance variation of the developing roller according to the present exemplary embodiment. This processing enables suitably correcting banding occurring at the time of image formation.

As described above, in the present exemplary embodiment, the controller 11 predicts an banding amplitude in consideration of the dependency of banding amplitude variation on the electrical resistance of the developing roller, and performs the banding correction processing based on the predicted banding amplitude. This method enables suitably correcting banding even when forming an image under different conditions from those at the time of correction table generation. This method further enables appropriately adjusting the generated correction table, eliminating the need of performing path measurement again to regenerate the correction table.

Although, in the present exemplary embodiment, the controller 11 predicts the electrical resistance of the developing roller based on the current application history, the processing is not limited thereto. For example, the electrical resistance of the developing roller may be predicted based on a print job history.

In the present exemplary embodiment, banding amplitude prediction is performed focusing attention on electrical resistance variation of the developing roller. However, as long as a physical property change in a device related to the banding amplitude is concerned, similar processing may be performed focusing attention on other factors. When successively performing image formation processing, the temperature of the developing roller may rise by the friction between the developing roller and the photosensitive drum 1001, possibly resulting in a banding amplitude change. As an example, a configuration for focusing attention on the phenomenon may be considered.

Although, in the present exemplary embodiment, the developing roller has a property that the banding amplitude increases at the time of continuous job execution and decreases in continuous non-operating state (without job execution), the property of the developing roller is not limited thereto. The tendency of the increase and decrease in banding amplitude of the developing roller may be different from the above examples depending on the material of module components. Even in this case, banding can be suitably prevented by similar configuration and processing to those in the present exemplary embodiment.

Although, in the present exemplary embodiment, the controller 11 utilizes a resistance-to-amplitude correspondence table recording the electrical resistance of the developing roller and the banding amplitude in an associated way when calculating the reference amplitude in the adjustment rate calculation processing (step S520), the processing is not limited thereto. As another example, it is also possible to use a function for calculating the banding amplitude based on the electrical resistance of the developing roller.

Although, in the present exemplary embodiment, the banding correction processing particularly corrects banding caused by the developing roller, banding subjected to correction is not limited thereto. With banding caused by a device performing a periodic movement, performing similar processing to the present exemplary embodiment enables performing suitable banding correction.

Although, in the present exemplary embodiment, the controller 11 predicts the electrical resistance of the developing roller each time the correction table generation processing and the correction image data generation processing are performed, the processing is not limited thereto. As another example, the electrical resistance of the developing roller may be predicted at a high frequency (for example, at one-second intervals). In this case, the current application history to be stored in the history storage unit 1107 covers a very short period since the electrical resistance of the developing roller was last predicted until the present time. For a very short period, the current application history can be approximated to either one of two states: "constantly OFF during the period" and "constantly ON during the period." This enables reducing the size of the storage area necessary to store the current application history.

A second exemplary embodiment of the present invention will be described below. In the first exemplary embodiment, the controller 11 focused attention on electrical resistance variation of the developing roller at the time of correction table generation and at the time of image formation.

In the present exemplary embodiment, the controller 11 predicts a banding amplitude focusing attention on the ambient temperature different from the one at the time of correction table generation and, based on the predicted banding amplitude, performs the banding correction processing. The configuration of the present exemplary embodiment will be described below. Components and processing equivalent to those in the first exemplary embodiment are assigned the same reference numerals, and duplicated descriptions will be omitted.

Image formation processing performed by an image forming apparatus according to the present exemplary embodiment and a configuration therefor are similar to those in the first exemplary embodiment.

Figure 14:
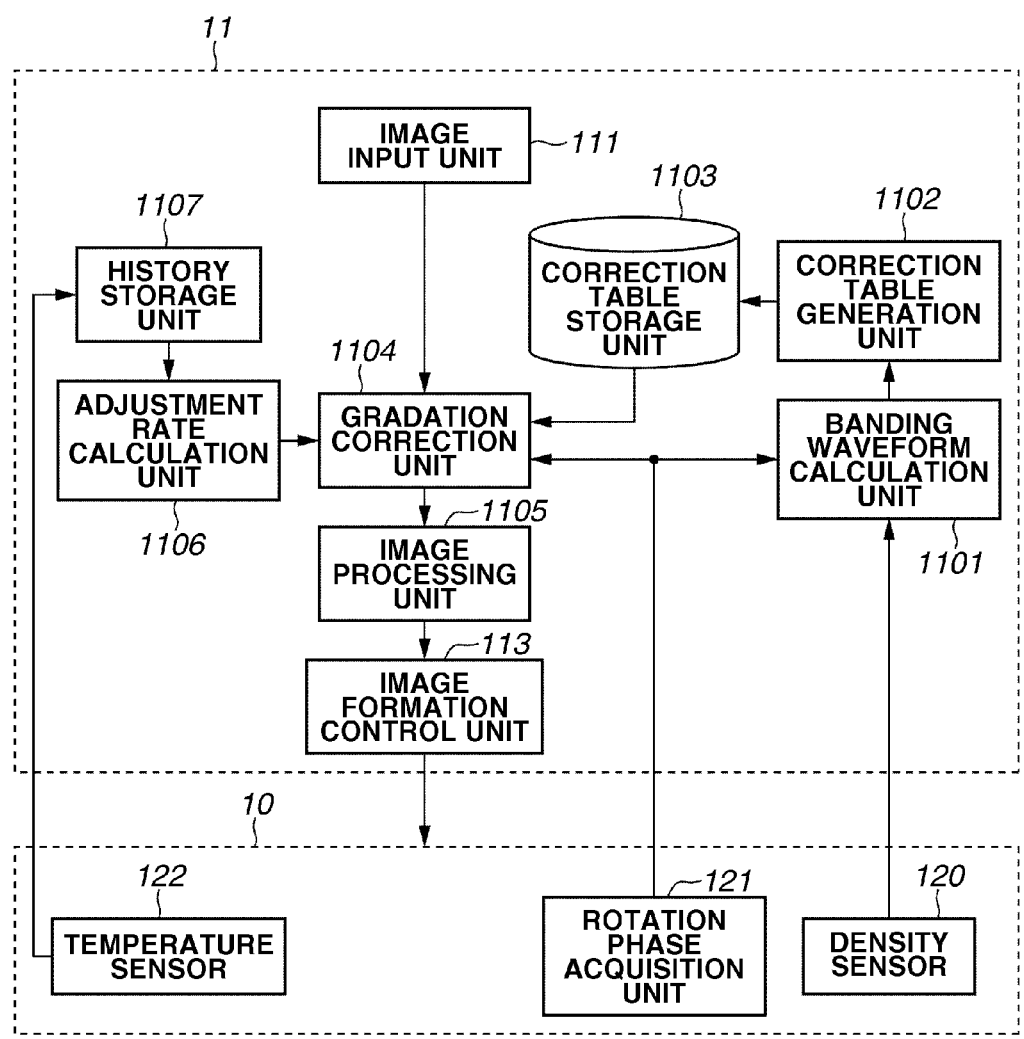
FIG. 14 is a block diagram illustrating a configuration for banding correction according to a second exemplary embodiment of the present invention.

FIG. 14 is a block diagram illustrating a configuration of the image forming apparatus according to the present exemplary embodiment for performing the banding correction processing. The configuration of the present exemplary embodiment differs from that of the first exemplary embodiment in that a temperature sensor 122 is additionally provided. The temperature sensor 122 acquires the ambient temperature, and outputs the temperature to the adjustment rate calculation unit 1106.

The banding correction processing according to the present exemplary embodiment will be described in detail below. Similar to the first exemplary embodiment, the banding correction processing according to the present exemplary embodiment also includes the correction table generation processing and the correction image data generation processing.

Figure 15:
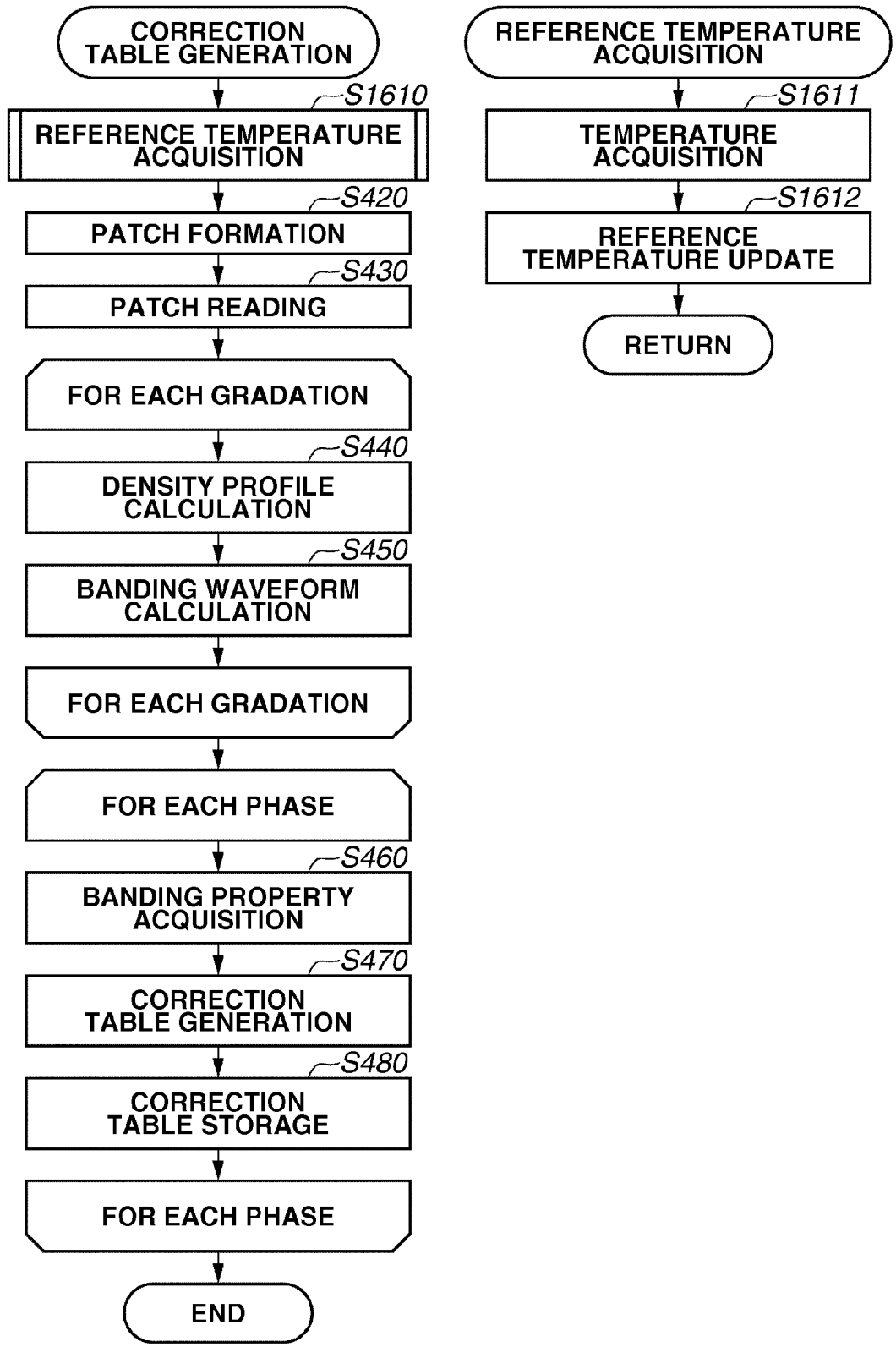
FIG. 15 is a flowchart illustrating correction table generation processing according to the second exemplary embodiment.

The correction table generation unit 1102 generates a correction table. FIG. 15 is a flowchart illustrating the correction table generation processing according to the present exemplary embodiment. The correction table generation processing according to the present exemplary embodiment differs from that according to the first exemplary embodiment in that the reference temperature acquisition processing (step S1610) is performed instead of the reference resistance prediction processing (step S410). Each time the correction table generation processing, the correction table stored in the correction table storage unit 1103 and the reference temperature stored in the history storage unit 1107 are updated. Further, the correction table and the reference temperature are discarded when the power is turned off. The reference temperature updated is the temperature when the correction table is generated. The processing for acquiring the temperature is executed also in the correction image data generation processing (described below). Then, based on the reference temperature acquired here and the temperature at the time of image formation to be acquired in the correction image data generation processing, the controller 11 adjusts the correction table so as to suitably correct banding occurring at the time of image formation.

In step S1610, the controller 11 executes the reference temperature acquisition processing. In step S1611, the temperature sensor 122 detects the temperature. In step S1612, the controller 11 updates the reference temperature stored in the history storage unit 1107 to the detected temperature. Subsequently, the controller 11 executes the processing in steps S420 to S480 described in the first exemplary embodiment.

Then, the controller 11 executes the correction image data generation processing. The correction image data generation processing according to the present exemplary embodiment differs from that according to the first exemplary embodiment only in the adjustment rate calculation processing (step S520).

Figure 16:
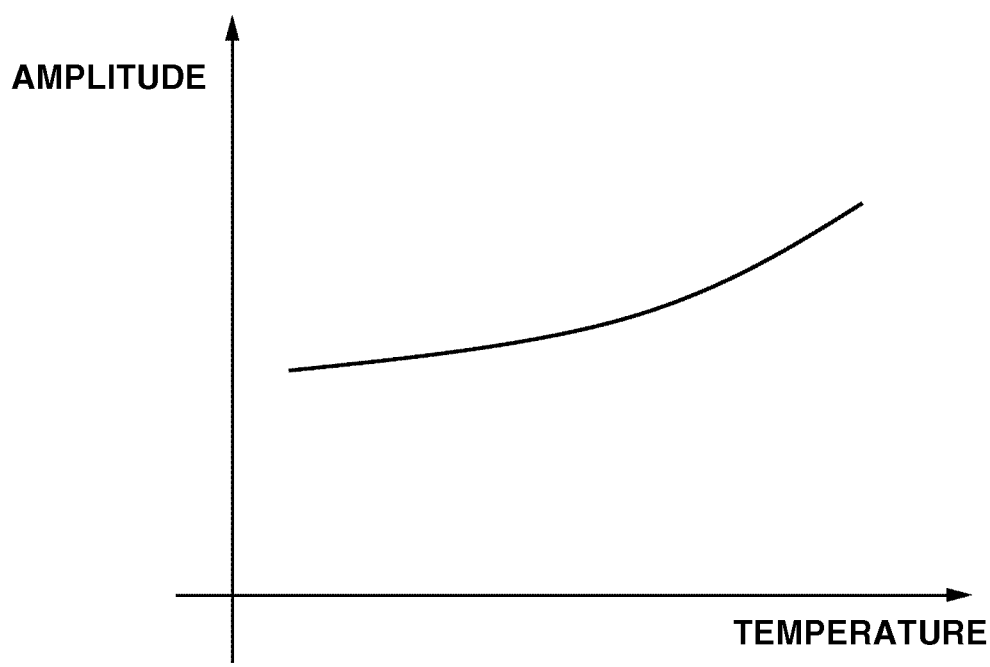
FIG. 16 is an example of a temperature-to-amplitude correspondence table according to the second exemplary embodiment.

The adjustment rate calculation processing (step S520) according to the present exemplary embodiment will be described below. The adjustment rate calculation unit 1106 calculates the temperature at the time of image formation. Then, the adjustment rate calculation unit 1106 calculates a reference amplitude. The reference amplitude is the banding amplitude when the correction table generation processing was last performed. In this case, the controller 11 utilizes a prestored temperature-to-amplitude correspondence table. FIG. 16 illustrates an example of the temperature-to-amplitude correspondence table stored in the adjustment rate calculation unit 1106. The banding amplitude changes depending on the temperature. The temperature-to-amplitude correspondence table records banding amplitudes at respective temperatures. The controller 11 acquires a banding amplitude corresponding to the reference temperature detected in step S410 from the temperature-to-amplitude correspondence table, and considers it as the reference amplitude. Further, the adjustment rate calculation unit 1106 calculates an amplitude at the time of image formation. The amplitude at the time of image formation refers to the banding amplitude at the time of image formation. Similar to the reference amplitude calculation described above, the controller 11 acquires a banding amplitude corresponding to the temperature at the time of image formation, and considers it as the amplitude at the time of image formation.

Finally, the controller 11 calculates the adjustment rate by using the following formula (5).

$$(\text{Adjustment rate}) = (\text{Amplitude at the time of image formation})/(\text{Reference amplitude}) \quad (5)$$

As described above, in the present exemplary embodiment, the controller 11 executes the banding correction processing after adjusting a generated correction table in consideration of changes in the image forming apparatus due to the ambient temperature. Thus, more suitable banding correction can be achieved. Environmental information to be noticed is not limited to the temperature. The humidity and atmospheric pressure may be noticed.

To acquire environmental information such as temperature, humidity, atmospheric pressure, etc., it is also possible to provide not only various sensors as illustrated in the present exemplary embodiment but also an interface for enabling a user to input relevant information.

In the above-described exemplary embodiments, the image forming apparatus is capable of generating a correction table based on the result of patch image measurement. According to the exemplary embodiments of the present invention, even if a device related to image formation has changed under different conditions from those at the time of correction table generation, the correction table can be adjusted based on the prediction amplitude at the time of image formation. This enables suitably correcting the correction table without generating a new correction table even under different conditions from those at the time of correction table generation.

Although, in the above-described exemplary embodiments, the reference state (temperature and resistance) is calculated each time the correction table generation processing is performed, the processing is not limited thereto. For example, the correction table generation processing may be performed only when the environment and device related to image formation are in a sufficiently steady state. In this case, in the first exemplary embodiment, for example, the steady-state electrical resistance $R_{max}$ can be constantly used as the reference resistance.

Aspects of the present invention can also be realized by a computer of a system or apparatus (or devices such as a central processing unit (CPU) or a micro-processing unit (MPU) which may also be referred to as a microprocessor) that reads out and executes a program recorded on a memory device to perform functions of one or more of the above-described embodiments of the present invention, and by a method, the steps of which are performed by a computer of a system or apparatus by, for example, reading out and executing a program recorded on a memory device to perform functions of one or more of the above-described embodiments of the present invention. The program can be provided to the computer, for example, via a network or from a recording medium of various types serving as the memory device (e.g., non-transitory computer-readable medium). The computer-readable medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-230909 filed Oct. 20, 2011, which is hereby incorporated by reference herein in its entirety.

What is claimed is:

1. An image forming apparatus for forming an image based on an electrophotographic process applied to image data that represents the image, the image forming apparatus comprising:
   a device configured to perform a periodic movement for image formation;
   a storage unit configured to store a table for correcting density variation caused by the device, the table generated when a physical property of the device is in a reference state, wherein the table is used to correct periodic density variation in a direction in which the device is rotated and a correction amount according to a gradation is derived at each phase in the direction in which the device is rotated;
   a prediction unit configured to predict an amplitude of the variation caused when the physical property is in a state different from the reference state; and
   an adjustment unit configured to adjust the table based on the amplitude predicted by the prediction unit,
   wherein the adjustment unit is configured to adjust the amplitude of the density variation corrected by the table.

2. The image forming apparatus according to claim 1, further comprising a correction unit configured to correct at least one value of the image data based on the table.

3. The image forming apparatus according to claim 1, further comprising an acquisition unit configured to acquire an operation history of the image forming apparatus,
   wherein the prediction unit is configured to predict the amplitude by using the operation history.

4. The image forming apparatus according to claim 3, wherein the operation history includes a history of current application to the device.

5. The image forming apparatus according to claim 3, wherein the operation history includes a print job history.

6. The image forming apparatus according to claim 1, further comprising an environmental information detection unit configured to detect environmental information,
   wherein the prediction unit is configured to predict, based on the environmental information, the amplitude of the variation caused when the physical property is in the state different from the reference state.

7. The image forming apparatus according to claim 1, wherein the adjustment unit is configured to calculate an adjustment rate based on the amplitude in the reference state and the amplitude predicted by the prediction unit, and to adjust the table by using the adjustment rate.

8. The image forming apparatus according to claim 1, wherein the device includes a developing roller.

9. The image forming apparatus according to claim 1,
   wherein the storage unit includes a plurality of tables for deriving correction amounts according to gradations at different phases in the direction in which the device is rotated, and
   wherein the adjustment unit is configured to adjust the plurality of tables.

10. The image forming apparatus according to claim 1, wherein the adjustment unit is configured to calculate an adjustment rate to be calculated from a change rate of the physical property in the reference state and the physical property in the state different from the reference state and to adjust the correction amount in the table based on the adjustment rate.

11. A non-transitory computer-readable storage medium storing a computer program for use in an operating environment that includes a computer, a device, and a storage unit, the device configured to perform a periodic movement for forming an image based on an electrophotographic process, the electrophotographic process applied to image data that represents the image, wherein the computer program is configured to cause the computer to perform a method of correcting the image data, the method comprising:
   storing, in the storage unit, a table for correcting density variation caused by the device, the table generated when a physical property of the device is in a reference state, wherein the table is used to correct periodic density variation in a direction in which the device is rotated and a correction amount according to a gradation is derived at each phase in the direction in which the device is rotated;
   predicting an amplitude of the variation caused when the physical property is in a state different from the reference state; and
   adjusting the table based on the predicted amplitude,
   wherein the adjusting adjusts the amplitude of the density variation corrected by the table.

12. A method of correcting image data that represents an image, the method for use with forming the image based on an electrophotographic process applied to image data, the method for use in an operating environment that includes a device and a storage unit, the device configured to perform a periodic movement for forming the image based on the electrophotographic process, the method comprising:
   storing, in the storage unit, a table for correcting density variation caused by the device, the table generated when a physical property of the device is in a reference state, wherein the table is used to correct periodic density variation in a direction in which the device is rotated and a correction amount according to a gradation is derived at each phase in the direction in which the device is rotated;
   predicting an amplitude of the variation caused when the physical property is in a state different from the reference state; and
   adjusting the table based on the predicted amplitude,
   wherein the adjusting adjusts the amplitude of the density variation corrected by the table.

* * * * *